3,345,015
AIRCRAFT
Olle Ljungström, Lidingo, Sweden, assignor to Saab Aktiebolag, Linkoping, Sweden, a corporation of Sweden
Filed Sept. 13, 1965, Ser. No. 486,834
3 Claims. (Cl. 244—13)

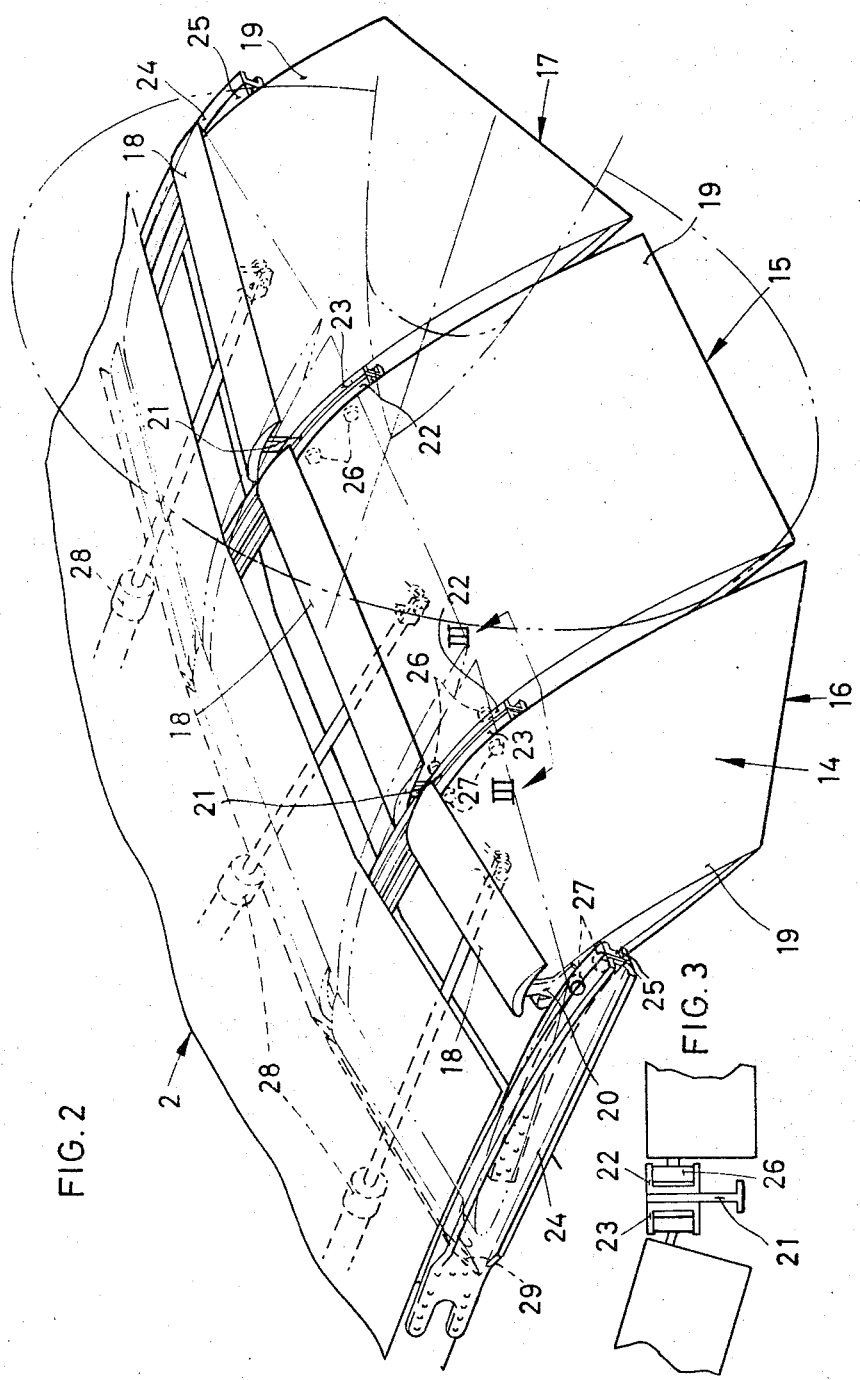

The present invention relates to an aircraft having a fixed main wing, empennage comprising horizontal and vertical control surface units, and at least two power driven propellers.

With aircraft of the above mentioned kind it is usually desired to attain the highest possible cruising speed in combination with the lowest possible speed of takeoff and landing, the latter in order to reduce the takeoff and landing runs as far as possible.

In order to obtain a desired low speed at takeoff and landing an increase of lift of the wing is often required. This increase can be achieved by different kinds of high lift devices which are arranged on the wing and provide the increase of lift by a strong deflection of the air flow down over the wing. In some cases high lift can also be achieved by utilizing the propeller slip stream. High lift devices can consist of, e.g., flap arrangements in the leading and trailing edges of the wing, possibly combined with boundary layer control on the wing obtained, e.g., by blowing air on the flaps. In deflecting the air flow over the wing high lift devices of this type produce a large downwash of the air behind the wing, with the result that there is the risk of the empennage coming into a strongly disturbed energy lacking flow region during flight at low speed and large angles of attack, so that the empennage is stalled at the same time that the air force redistribution on the wing caused by the high lift device makes great demands upon the ability of the empennage to trim and stabilize the aircraft. For the last mentioned purposes extraordinary measures are often required such as increase of the control surface area, high location of the empennage and further auxiliary means such as control surface blast or jet control in the empennage. These measures have the disadvantage that they load the aircraft unfavourably, resulting in an increase of drag, weight and complexity.

One object of the present invention is to provide an aircraft propelled by power driven propellers wherein the empennage has comparatively small dimensions but in spite of this is efficient over the whole speed range, down to very low speeds at takeoff and landing, so that there is no need for such expedients as control surface blast or jet control to provide for control and stabilization in flight at low speed and high angles of attack during full utilization of the high lift device of the wing.

Another object of the invention is to provide an aircraft of the above kind wherein in addition to achieving efficiency of the empennage, there is also obtained an increase of the circulation flow around the wing and thereby a corresponding increase of the lift of the wing.

In general the above stated objects are attained in an aircraft of the above described character by arranging the propellers on the front end of nacelles symmetrically supported by the empennage on either side thereof and projecting forwardly therefrom to the vicinity of the wing so that the slip stream of the propellers sweeps over the horizontal and vertical control surfaces units, and by providing the wings with trailing edge flap means in front of the propellers which flap means is guided in the wing for motion chordwise thereof between a forward retracted position within the wing and a rear downwardly deflected position wherein the rear parts of the flap means are close to the propeller disk area.

With the above and other objects in view which will appear as the description proceeds this invention resides in the novel construction, combination and arrangement of parts substantially as hereinafter described and more particularly defined by the appended claims, it being understood that such changes in the precise embodiment of the hereindisclosed invention may be made as come within in the scope of the claims.

The accompanying drawings illustrate complete examples of the physical embodiments of the invention, constructed according to the best modes so far devised for the practical application of the principles thereof, and in which FIGURE 1 is a perspective view of an aircraft of this invention shown in a flight condition of takeoff or landing.

FIGURE 2 is a perspective view on a larger scale of a portion of the aircraft shown in FIGURE 1.

FIGURE 3 is a view in cross section along the line III—III in FIGURE 2 showing guides for guiding the flap.

Figure 1:
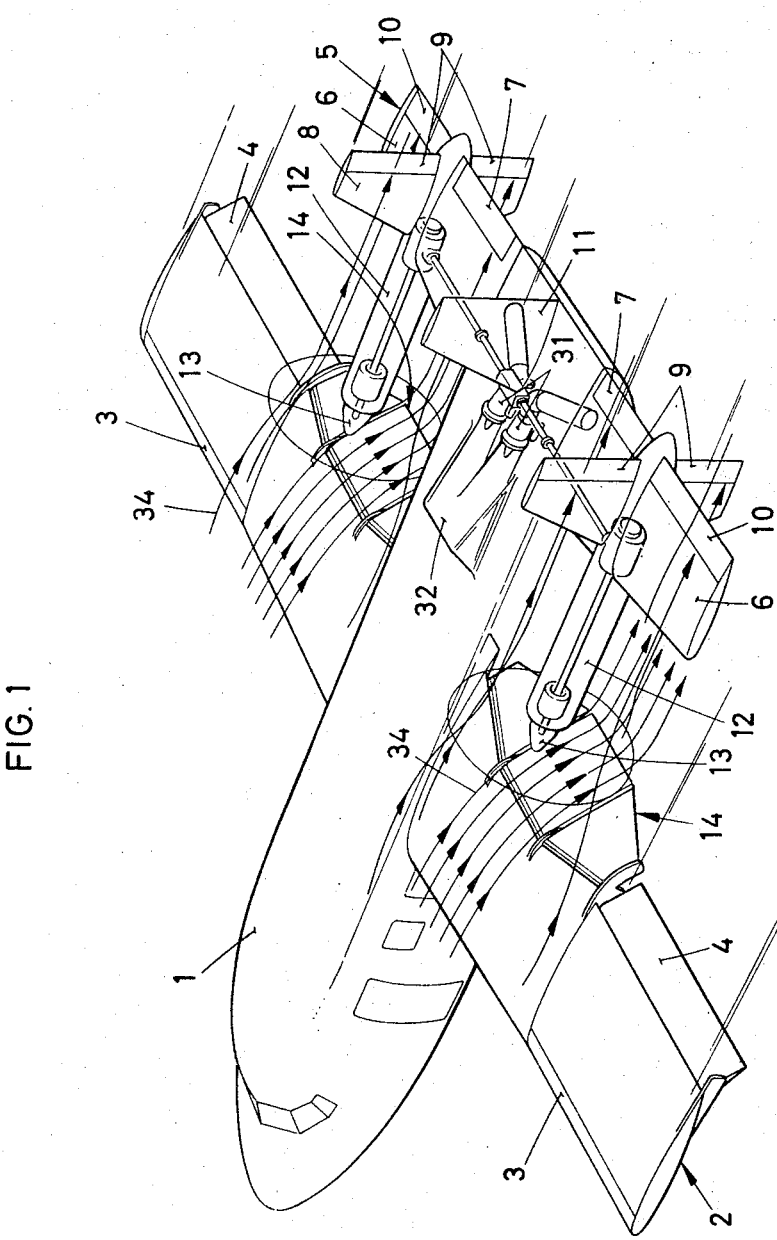

The aircraft shown on the drawings comprises a fuselage 1 to which is attached an overhead wing 2 that has a substantially rectangular shape in plan form. The wing is provided with a conventional high lift device comprising foldable parts 3 in the leading edge of the wing which extend inwardly from the wing tips a distance towards the fuselage, and folding trailing edge flaps 4 positioned directly behind the parts 3. The fuselage supports on its tail end an overhead empennage 5 comprising a horizontal stabilizer unit 6 projecting from the fuselage at each side thereof and provided with conventional elevators 7, vertical outboard fin surfaces 8 which are supported by and project above and below the horizontal stabilizer 6 and are provided with conventional rudders 9, aileron controls 10 which are movably supported by the horizontal stabilizer surfaces 6 outboard of the elevators and the fins 8, and finally a fixed fin 11 on the fuselage 1, in the plane of symmetry of the aircraft and parallel with the fin surfaces 8, for yaw stabilization of the aircraft.

In the intersections between the outboard vertical fins 8 and the horizontal stabilizers 6 the empennage 5 fixedly supports nacelles 12 which project forwardly of the empennage 5 to the vicinity of the wing 2. The nacelles are provided at their front end with tractor propellers 13 for propelling the aircraft, so positioned that the slip stream of the propellers sweeps over the control surfaces and aileron controls of the empennage. That portion of the wing that is in front of each propeller, between the trailing edge flap 4 and the fuselage, is provided with a folding trailing edge flap 14. As more clearly shown in FIGURE 2 the flap 14 is spanwise divided into three sections, viz. a middle section 15 of substantially rectangular shape in plan view and two outer sections 16 and 17 of trapezoidal shape in plan view. Each flap section is chordwise divided into two flap parts 18 and 19 which are spaced from one another by means of rigid spacers 20 so that the flap parts of all the sections cooperate with one another and with the wing to form a double slotted trailing edge flap. The flaps are guided in the wing for motion chordwise between a forward retracted position within the wing, as shown in broken lines, and a rear downwardly deflected position wherein the rear parts of the flaps are close to the lower part of the propeller disk area with the trailing edges disposed substantially along an arc concentric with the propeller and conforming to the lower portion of the propeller disc as shown in solid lines. In the embodiment shown the flaps are movably supported by the wing by means of two inner brackets 21 each of which is provided with double arcuate U-shaped guide rails 22, 23 on opposite sides of the bracket, which rails extend rearwardly and downwardly from the wing, and a pair of outer brackets 24, each carrying a single guide rail 25 having a larger radius of curvature than the guide rails 22, 23. The inner flap section 15 is guidingly supported in the adjacent guide rails 22 by a pair of spaced ball bearings 26 mounted on each side edge of the middle section, and each of the outer flap sections 16 and 17 is guidingly supported in a similar way in the corresponding guide rails 23 and 25 by a pair of spherical ball bearings 27, permitting a deflection of the outer section relative to the inner section due to the different radius of curvature of the double and single guide rails. Since the outer single guide rails 25 have a larger radius of curvature than the double guide rails 22 and 23, the outer sections will swing upwardly relative to the inner section when the flap is moved rearwardly and downwardly by means of actuators 28 in the wing. By this the flap assumes in its downwardly deflected position the shape of a short slanting chute the inside of which substantially follows the lower part of the periphery of the propeller disk area. In the retracted position of the flap in the wing the slots between the flap parts 18 and 19 are covered by a door 29 which is pivotally suspended from the wing.

Figure 4:
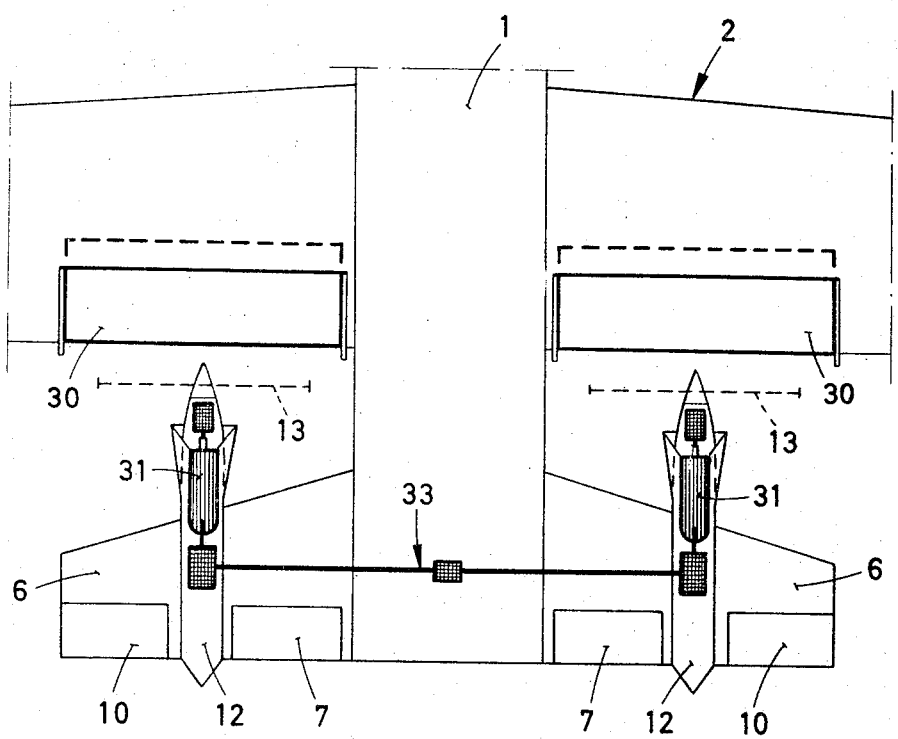
FIGURE 4 is a diagrammatic plan view, with portions in section, of a modified embodiment of the invention, differing from that shown in FIGURES 1–3 mainly with respect to the trailing edge flaps and the power plant of the aircraft.

In the embodiment shown in FIGURE 4 the flaps consist of rigid double slotted flaps 30. The flaps can also be provided with boundary layer control such as flap blowing.

Two power plants 31 which drive the propellers 13 are arranged, according to the embodiment shown in FIGURE 1, side by side in the fuselage 1, inboard of the horizontal stabilizer unit 6. The power plants are supplied with air from an air intake 32 centrally positioned on the top side of the fuselage and have their exhaust openings located in the sides of the fuselage below the horizontal tail surfaces. In the embodiment shown in FIGURE 4 the power plants are enclosed in the nacelles 12. The propellers 13 are, in each embodiment, so connected to one another and the power plants that the propellers are always driven even though one of the power plants stops. On the drawings this connection is shown as shaft transmissions 33 but it can also comprise other means. The connection between the propellers can be eliminated if the demands of yaw and roll trim which are made upon the empennage during flight with only one driving propeller can be met.

The operation of the aircraft according to the invention will be explained in the following. By reason of the location of the propellers 13 at the front of the nacelles 12 which project forwardly from the empennage 5, the propeller slip streams sweep over the horizontal and vertical control surfaces and the ailerons; hence as long as the propellers are driven, the control surfaces on the empennage are always in an air flow which is sufficient to cause the controls therein to give rise to such control forces on the empennage as are required for maneuvering the aircraft. Hence the efficiency of the empennage is increased at low speeds to provide good yaw and pitch stability and the aircraft can be banked by the aileron controls 10. By reason of the above described location of the ailerons, the portion of the wing which otherwise would have been occupied by ailerons can be utilized for lift increasing trailing edge flaps 4 possibly combined with flow disturbing flaps on the outer portions of the wing. By placing the propellers 13 at the front of nacelles 12 which are supported by the empennage 5 instead of placing nacelles on the wing 2 it is further obtained that the wing will be structurally and aerodynamically clean and will be undisturbed by the slip stream turbulence. Such an aerodynamic cleanness of the wing is advantageous and makes it possible to increase the performance of the wing considerably in that it permits the introduction of devices for boundary layer control so that laminar flow is obtained over the whole wing in combination with decreased wing area.

The location of the folding trailing edge flaps 14 and 30 of the wing in front of the propellers 13, close to the lower part of the periphery of the propeller disk area, makes it possible to efficiently utilize the propeller slip stream, or more correctly the energy rich cylindrical flow through the propellers, for generating lift on the wing. This lift is generated because the propeller in flight condition with downwardly deflected trailing edge flaps 14, sucks air from an air flow 34 passing over the wing 2 and gives it an impulse downwardly so that the flow of circulation around the wing is increased and the wing thereby receives increased lift.

A small light aircraft embodying the invention could have only one centrally located power plant driving two propellers connected to each other by means of, e.g. V-belt transmissions.

What is claimed is:
1. An aircraft of the type comprising a fuselage, a wing mounted on the fuselage a distance forwardly of the rear end thereof, flaps on the wing extendable rearwardly and downwardly therefrom and retractable partway thereinto, horizontal tail surfaces on the rear of the fuselage projecting to opposite sides thereof, a pair of vertical tail surfaces carried by the horizontal tail surfaces at opposite sides of the fuselage, and a pair of rotatably driven propellers, said aircraft being characterized by the following features of arrangement:
   (A) the vertical tail surfaces being located intermediate the fuselage and the tips of the horizontal tail surfaces;
   (B) each of the propellers
       (1) being carried by means comprising a nacelle mounted on a horizontal tail surface,
       (2) with the axis of the propeller lying substantially in the planes of its horizontal tail surface a vertical tail surface, and
       (3) with the propeller disposed between the wing and the tail surfaces so that substantially all portions of the tail surfaces are in the slipstreams from the propellers; and
   (C) the flaps, in their extended position, having their trailing edges adjacent to the lower portions of the propeller disc peripheries so that the propellers draw air across the upper surfaces of the wing and flaps.
2. The aircraft of claim 1, further characterized by:
   (A) the flaps being spanwise divided at each side of the fuselage; and
   (B) the flaps being so guided for extension that the trailing edges of the several flap sections at each side of the fuselage are disposed substantially along an arc concentric with the propeller and conforming to the lower portion of the propeller disc periphery therebehind.
3. The aircraft of claim 1, further characterized by:
   (A) additional flaps on the outboard portions of the wing at the trailing edge portion thereof; and
   (B) ailerons on the horizontal tail surfaces outboard of the vertical tail surfaces.

References Cited
UNITED STATES PATENTS 1,289,683   12/1918   Curtiss _____ 244—13

MILTON BUCHLER, *Primary Examiner.*
A. E. CORRIGAN, *Assistant Examiner.*

UNITED STATES PATENT OFFICE
CERTIFICATE OF CORRECTION

Patent No. 3,345,015          October 3, 1967

Olle Ljungström

It is hereby certified that error appears in the above numbered patent requiring correction and that the said Letters Patent should read as corrected below.

Column 4, line 40, after "surface" insert -- and --.

Signed and sealed this 15th day of October 1968.

(SEAL)
Attest:

Edward M. Fletcher, Jr.

Attesting Officer

EDWARD J. BRENNER

Commissioner of Patents